(12) United States Patent
Ma

(10) Patent No.: US 12,443,070 B2
(45) Date of Patent: Oct. 14, 2025

(54) LIQUID CRYSTAL DISPLAY PANEL

(71) Applicant: WUHAN CHINA STAR OPTOELECTRONICS TECHNOLOGY CO., LTD., Hubei (CN)

(72) Inventor: Kun Ma, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/905,174

(22) PCT Filed: Aug. 15, 2022

(86) PCT No.: PCT/CN2022/112509
§ 371 (c)(1),
(2) Date: Feb. 8, 2024

(87) PCT Pub. No.: WO2024/026925
PCT Pub. Date: Feb. 8, 2024

(65) Prior Publication Data
US 2024/0201534 A1 Jun. 20, 2024

(30) Foreign Application Priority Data
Aug. 5, 2022 (CN) .......................... 202210938789.X

(51) Int. Cl.
*G02F 1/13357* (2006.01)
*G02F 1/1335* (2006.01)

(52) U.S. Cl.
CPC .. *G02F 1/133526* (2013.01); *G02F 1/133514* (2013.01); *G02F 1/133528* (2013.01)

(58) Field of Classification Search
CPC ........ G02F 1/133526; G02F 1/133514; G02F 1/133528
(Continued)

(56) References Cited

U.S. PATENT DOCUMENTS

2007/0171493 A1 7/2007 Nakanishi
2007/0279551 A1* 12/2007 Umebayashi ........ G02B 6/0055
349/65
(Continued)

FOREIGN PATENT DOCUMENTS

CN 101082735 A 12/2007
CN 101101349 A 1/2008
(Continued)

OTHER PUBLICATIONS

Chinese Office Action issued in corresponding Chinese Patent Application No. 202210938789.X dated Mar. 25, 2023, pp. 1-7.
(Continued)

*Primary Examiner* — Michael H Caley
(74) *Attorney, Agent, or Firm* — PV IP PC; Wei Te Chung

(57) ABSTRACT

The present invention relates to a liquid crystal display panel. A first polarizer of the present invention has a plurality of microlens structures disposed on a side of a polarizing film adjacent to a backlight module, and the plurality of microlens structures are configured to converge light emitted by the backlight module, so that more light is converged upward and enters the polarizing film. Therefore, a light utilization rate is increased, a brightness of the liquid crystal display panel is increased, and a power consumption of the liquid crystal display panel is reduced.

20 Claims, 2 Drawing Sheets

(58) Field of Classification Search
USPC .......................................................... 349/95
See application file for complete search history.

(56) References Cited

U.S. PATENT DOCUMENTS

| 2011/0069253 A1 | 3/2011 | Murao |
| 2011/0221999 A1 | 9/2011 | Shiau |
| 2019/0196270 A1* | 6/2019 | Hori .................. G02F 1/133611 |

FOREIGN PATENT DOCUMENTS

| CN | 102819060 A | 12/2012 |
| CN | 203811948 U | 9/2014 |
| CN | 110068948 A | 7/2019 |
| CN | 111108509 A | 5/2020 |
| CN | 113835144 A | 12/2021 |
| CN | 215297845 U | 12/2021 |
| CN | 215986824 U | 3/2022 |
| JP | 2003195275 A | 7/2003 |
| JP | 2009271346 A | 11/2009 |
| JP | 2011154078 A | 8/2011 |

OTHER PUBLICATIONS

International Search Report in International application No. PCT/CN2022/112509, mailed on Dec. 21, 2022.
Written Opinion of the International Search Authority in International application No. PCT/CN2022/112509, mailed on Dec. 21, 2022.

* cited by examiner

LIQUID CRYSTAL DISPLAY PANEL

FIELD OF DISCLOSURE

The present disclosure relates to the field of display technology, and more particularly, to a liquid crystal display panel.

BACKGROUND OF DISCLOSURE

A display device can convert data of computers into various characters, numbers, symbols, or intuitive images for display, and input tools such as keyboards can be utilized to input commands or data into the computers, and add, delete, and change content of the display any time with help of hardware and software of a system. Display devices are classified into types such as plasma, liquid crystal, light emitting diode, cathode light ray tube, etc., according to display elements in use.

Liquid crystal display (LCD): a liquid crystal display has liquid crystal material as basic elements, through filling liquid crystal material between two parallel plates, and changing an arrangement of molecules inside the liquid crystal material by voltage, a purpose of shielding and transmitting light to display different images of shades and scattered patterns are achieved. In addition, as long as three primary color filter layers are added between two planar plates, a display of color images can be achieved.

In a conventional LCD display panel, light is polarized in an upper and a lower polarizing films, and a transmittance of a single-layer polarizing film is only about 40%. After the light passes through the lower polarizing film, an array substrate, a liquid crystal layer, a color filter substrate, and the upper polarizing film, an overall penetration rate of the LCD display panel is only 4%. Most of the light is consumed, resulting in problems such as low light utilization rate, low brightness, and high power consumption.

SUMMARY

The present application provides a liquid crystal display panel that can solve problems of low light utilization, low brightness, and high power consumption of a conventional liquid crystal display panel.

In order to solve the above-mentioned problems, the present application provides a liquid crystal display panel including: a backlight module; a first polarizer disposed on a side of the backlight module; and an array substrate disposed on a surface on a side of the first polarizer away from the backlight module. The first polarizer includes: a polarizing film disposed between the array substrate and the backlight module; and a plurality of microlens structures arranged in an array on a side of the polarizing film facing the backlight module. The backlight module includes a first prism film, and a surface on a side of the first prism film adjacent to the array substrate has a plurality of triangular prism structures arranged in an array and protruding toward the array substrate; a first groove is defined between two adjacent ones of the plurality of triangular prism structures, and each of the plurality of microlens structures covers at least one of the plurality of first grooves. Any two adjacent ones of the plurality of microlens structures are abutted against each other, and an abutting side of any two adjacent ones of the plurality of microlens structures is disposed corresponding to a ridge on a side of one of the plurality of triangular prism structures adjacent to the polarizing film.

Furthermore, both the plurality of microlens structures and the plurality of triangular prism structures of the first prism film extend along a first direction.

Furthermore, a refractive index of a material of each of the plurality of microlens structures is greater than 1.6.

Furthermore, a first surface on a side of each of the plurality of microlens structures adjacent to the backlight module is planar, and a second surface on a side of each of the plurality of microlens structures away from the back light module is an arc surface convex toward the array substrate.

Furthermore, in a section perpendicular to the first direction, an angle between a tangent line of an end point on a side of the second surface of each of the plurality of microlens structures adjacent to the backlight module and the first surface ranges from 30° to 60°.

Furthermore, a first gap is defined between the plurality of second surfaces of two adjacent ones of the plurality of microlens structures and a surface on a side of the polarizing film adjacent to the backlight module.

Furthermore, the first polarizer further includes: a planarization layer disposed in at least one of the plurality of first gaps.

Furthermore, a refractive index of a material of the planarization layer is less than the refractive index of the material of the plurality of microlens structures.

Furthermore, a width of the first surface on the side of each of the plurality of microlens structures adjacent to the backlight module is a first width, and the first width of each of the plurality of microlens structures ranges from 24 micrometers (μm) to 200 μm.

Furthermore, a height of the plurality of microlens structure ranges from 12 μm to 70 μm.

Furthermore, a ratio of the first width to the height of the plurality of microlens structure ranges from 2:1 to 3:1.

Furthermore, a width between two ridges on a side of two adjacent ones of the plurality of triangular prism structures adjacent to the array substrate is a second width; the second width ranges from 24 μm to 110 μm.

Furthermore, a ratio of the first width to the second width ranges from 1 to 3.

Furthermore, the backlight module further includes: a reflective film disposed on a side of the first prism film away from the array substrate.

Furthermore, the backlight module further includes: a second prism film disposed on the side of the first prism film away from the array substrate; wherein a surface on a side of the second prism film adjacent to the array substrate has a plurality of triangular prism structures arranged in an array and protruding toward the array substrate.

Furthermore, the plurality of triangular prism structures of the second prism film extend along a second direction perpendicular to the first direction.

Furthermore, the liquid crystal display panel further including: a color filter substrate disposed on a side of the array substrate away from the backlight module; and a liquid crystal layer disposed between the array substrate and the color filter substrate.

Furthermore, the array substrate includes: an array base and a thin-film transistor device disposed on a side of the array substrate away from the backlight module.

Furthermore, the color filter substrate includes: a color filter base arranged opposite to the array substrate; a black matrix disposed on a side of the color filter base facing the array substrate, the black matrix having a plurality of openings; and a color filter film arranged in the plurality of openings of the black matrix and extending and covering a surface on a side of the black matrix facing the array substrate.

Furthermore, the liquid crystal display panel further including: a second polarizer disposed on a side of the color filter substrate away from the array substrate; and a cover plate disposed on a side of the second polarizer away from the array substrate.

The first polarizer of the present invention has the plurality of microlens structures disposed on the side of the polarizing film adjacent to the backlight module, and the plurality of microlens structures are configured to converge light emitted by the backlight module, so that more light is converged upward and enters the polarizing film. Therefore, the light utilization rate is increased, the brightness of the liquid crystal display panel is increased, and the power consumption of the liquid crystal display panel is reduced.

In the present invention, through the first prism film in the backlight module cooperating with the plurality of microlens structures, after the light emitted by the backlight is refracted by the plurality of triangular prism structures, the light with a refraction angle ranging from 0 to 35° enters the plurality of microlens structures is refracted and converged by the plurality of microlens structures, so that more light is converged upwards into the polarizing film, thereby increasing the light utilization rate, increasing the brightness of the liquid crystal display panel, and reducing the power consumption.

BRIEF DESCRIPTION OF DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

REFERENCE NUMERAL

Figure 1:
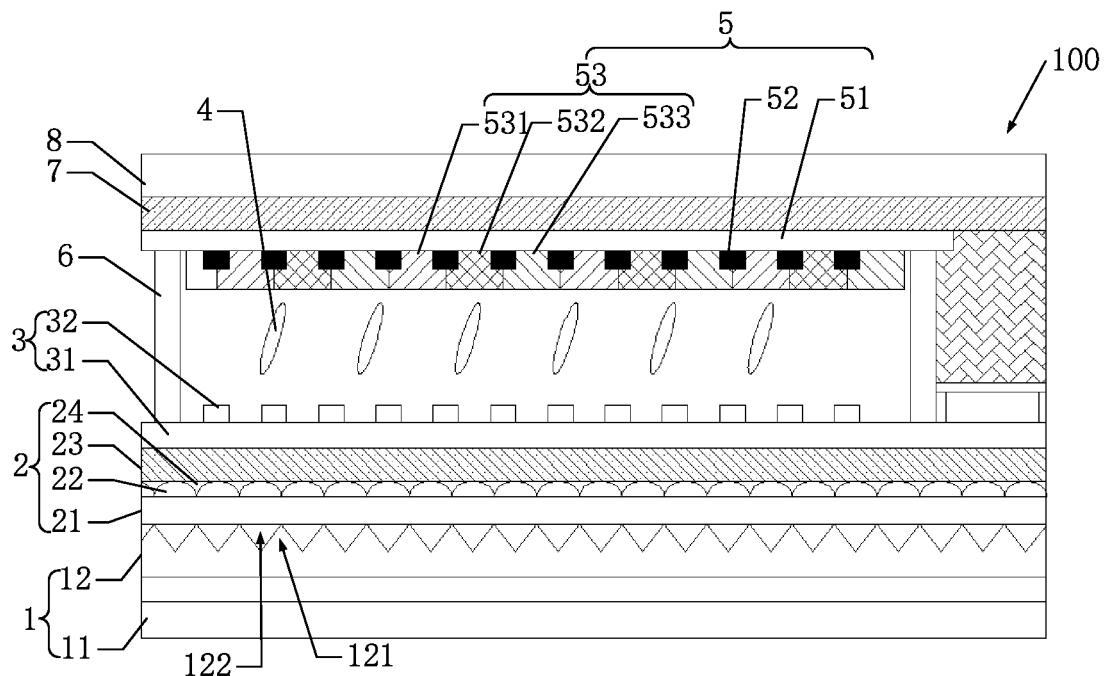
FIG. 1 is a structural schematic view of a liquid crystal display panel provided by a first embodiment of the present application.

100: Liquid crystal display panel;
1: backlight module; 2: first polarizer;
3: array substrate; 4: liquid crystal layer;
5: color filter substrate; 6: sealant;
7: second polarizer; 8: cover plate;
11: reflective film; 12: first prism film;
13: first light ray; 14: second light ray;
15: third light ray; 16: fourth light ray;
17: fifth light ray; 18: sixth light ray;
19: second prism film;
121: triangular prism structure; 122: first groove;
21: base;
22: microlens structure; 23: polarizing film;
24: first gap; 25: planarization layer;
31: array base; 32: thin-film transistor device;
51: color filter base; 52: black matrix;
53: color filter film; 531: red color resistance;
532: green color resistance; 533: blue color resistance.

DETAILED DESCRIPTION OF PRESENT EMBODIMENTS

A preferred embodiment of the present invention will be introduced in conjunction with appended drawings as follows to exemplify and demonstrate that the present invention can be implemented, so that the technical contents of the present invention are clearer and those skilled in the art understand how the present invention can be implemented. The present invention can be embodied in many different forms of embodiment, and the scope of protection of the present invention is not limited to the embodiments set forth herein. The descriptions of the embodiments in the following are not meant to limit the scope of the present invention.

In the appended drawings, structurally identical components are designated by the same reference numerals, and structurally or functionally similar components throughout are designated by similar numerical reference numerals. The dimensions and thicknesses of each component shown in the drawings are arbitrarily shown. The size and thickness of each component are not limited in the present invention.

Direction terms mentioned by the present invention, for example "upper," "lower," "front," "rear," "left," "right," "inner," "outer," "side," etc. are merely directions in the appended drawings for only explaining and illustrating the present invention. The orientation or positional relationship is only for the convenience of describing the present invention and simplifying the description, and should not be viewed as limitations of a scope of the present invention.

First Embodiment

Figure 2:
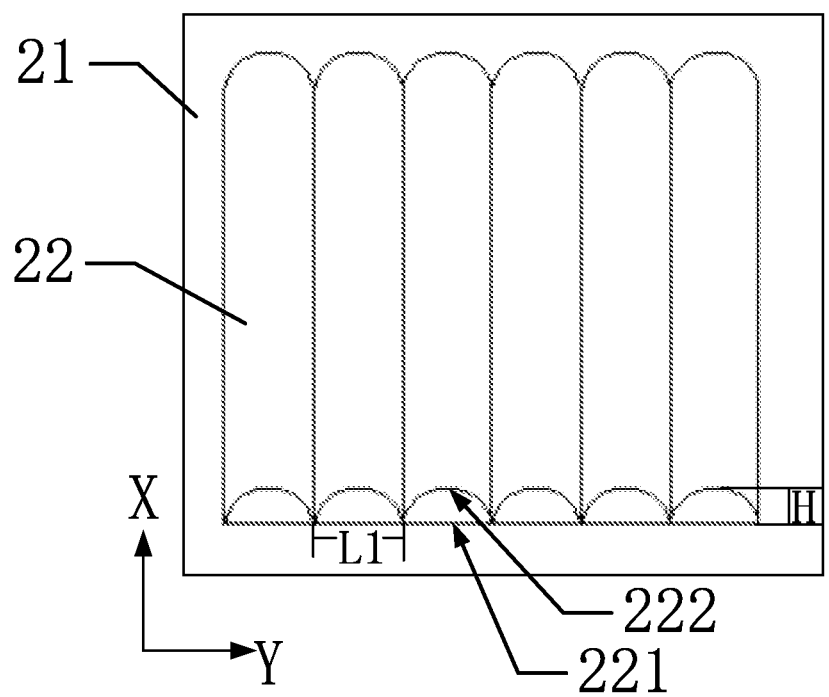
FIG. 2 is a schematic view of a projection of microlens structures on a base provided by the first embodiment of the present application.

As shown in FIG. 1 and FIG. 2, this embodiment provides a liquid crystal display panel 100. The liquid crystal display panel 100 includes a backlight module 1, a first polarizer 2, an array substrate 3, a liquid crystal layer 4, a color filter substrate 5, a sealant 6, a second polarizer 7, and a cover plate 8.

The backlight module 1 includes: a reflective film 11 and a first prism film 12. In fact, the backlight module 1 further includes a backlight source (not shown). The backlight source can be an edge-type backlight source or a direct-type backlight source, which is not limited in the present application.

The reflective film 11 is mainly configured to reflect light incident on the reflective film 11 to increase a light utilization rate.

The first prism film 12 is disposed on a side of the reflective film 11 facing the first polarizer 2.

A surface on a side of the first prism film 12 adjacent to the array substrate 3 has a plurality of triangular prism structures 121 arranged in an array and protruding toward the array substrate 3. Two adjacent ones of the plurality of triangular prism structures 121 are abutted against each other. A first groove 122 is formed between two adjacent ones of the plurality of triangular prism structures 121. The plurality of triangular prism structures 121 of the first prism film 12 extend along a first direction X.

The first polarizer 2 is disposed on a side of the backlight module 1. The first polarizer 2 includes: a base 21, a plurality of microlens structures 22, and a polarizing film 23.

As shown in FIG. 1, a base 21 is disposed between the array substrate 3 and the backlight module 1.

As shown in FIG. 1 and FIG. 2, the plurality of microlens structures 22 are arranged in an array on a surface on a side of the base 21 facing the array substrate 3. A refractive index of a material of each of the plurality of microlens structures 22 is greater than 1.6.

Figure 3:
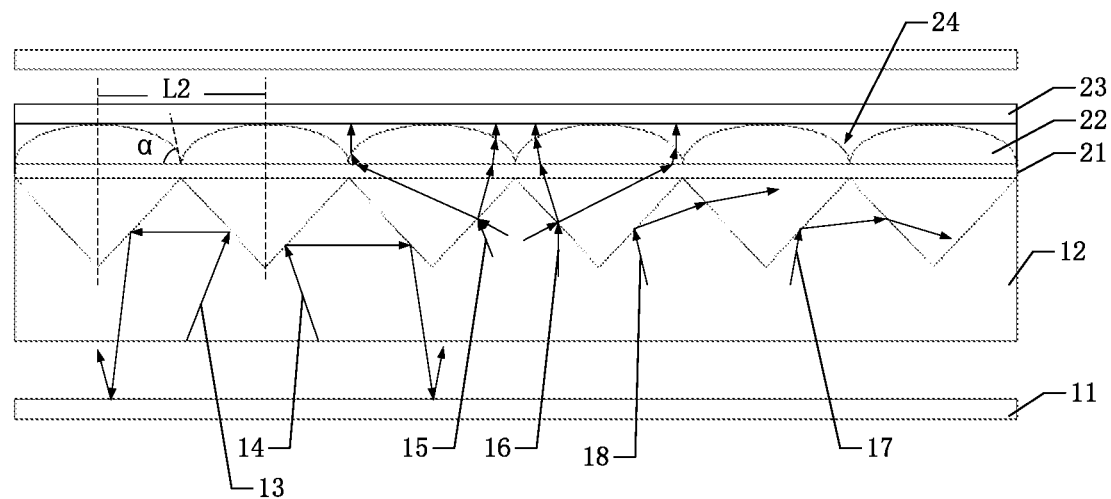
FIG. 3 is a schematic view of an optical path of the liquid crystal display panel provided by the first embodiment of the present application.

As shown in FIG. 2 and FIG. 3, a first surface 221 on a side of each of the plurality of microlens structures 22 adjacent to the backlight module 1 is planar, and a second surface 222 on a side of each of the plurality of microlens structures 22 away from the backlight module 1 is an arc surface that protrudes toward the array substrate 3.

As shown in FIG. 3, in a section perpendicular to the first direction X, an angle α between a tangent line of an end point of the second surface 222 on the side of each of the plurality of microlens structures 22 adjacent to the backlight module 1 and the base 21 ranges from 30° to 60°.

The plurality of microlens structures 22 extend along the first direction X. The plurality of microlens structures 22 are arranged along a second direction Y perpendicular to the first direction X. Two adjacent ones of the plurality of microlens structures 22 are abutted against each other, and each second surface of two adjacent ones of the plurality of microlens structures 22 and a surface on a side of the polarizing film 23 adjacent to the backlight module 1 form a first gap 24. A projection of the plurality of microlens structure 22 on the base 21 covers a projection of the plurality of triangular prism structures 121 on the base 21.

Each of the plurality of microlens structures 22 covers at least one of the plurality of first grooves 122. In this embodiment, each of the plurality of microlens structures 22 covers one of the plurality of first grooves 122, i.e., the plurality of microlens structures 22 and the plurality of triangular prism structures 121 are in a one-to-one correspondence.

An abutting edge of any two adjacent ones of the plurality of microlens structures 22 are disposed corresponding to a ridge on a side of the plurality of triangular prism structures 121 adjacent to the polarizing film 23. Specifically, in the section perpendicular to the first direction X, an abutting point of any two adjacent ones of the plurality of microlens structures 22 are both disposed corresponding to a vertex on the side of the plurality of triangular prism structures 121 adjacent to the polarizing film 23. In this way, it can be ensured that light passing through the first prism film 12 can be converged by the plurality of microlens structures 22, so as to converge more light, so that more light is converged upward into the polarizing film 23, thereby increasing the light utilization rate, increasing brightness of the liquid crystal display panel, and reducing power consumption.

As shown in FIG. 3, the plurality of microlens structures 22 are configured to converge the light emitted by the backlight module 1, so that more light is converged upward into the polarizing film 23, thereby increasing the light utilization rate, increasing the brightness of the liquid crystal display panel 100, and reduce the power consumption.

A width of the first surface 221 on the side of each of the plurality of microlens structures 22 adjacent to the backlight module 1 is a first width $L_1$, and the first width $L_1$ of each of the plurality of microlens structures 22 ranges from 24 micrometers (μm) to 200 μm. In this embodiment, the first width $L_1$ of the plurality of microlens structures 22 is 100 μm. It is worth noting that the width of the first surface 221 on the side of each of the plurality of microlens structure 22 adjacent to the backlight module 1 refers to a width of each of the plurality of microlens structures 22 in the section perpendicular to the first direction X.

A height H of the plurality of microlens structures 22 ranges from 12 μm to 70 μm. A ratio of the first width $L_1$ to the height H of the plurality of microlens structures 22 ranges from 2:1 to 3:1. In this embodiment, the height H of the plurality of microlens structure 22s is 50 μm, and the ratio of the first width $L_1$ to the height H of the plurality of microlens structures 22 is 2:1.

A second width $L_2$ ranges from 24 μm to 110 μm. A width between the ridges on a side of two adjacent ones of the plurality of triangular prism structures 121 adjacent to the array substrate 3 is the second width $L_2$. A ratio of the first width $L_1$ to the second width $L_2$ ranges from 1 to 3. In this embodiment, the ratio of the first width $L_1$ to the second width $L_2$ is 1, i.e., the second width $L_2$ in this embodiment is 100 μm. It is worth noting that the width between the ridges on the side of two adjacent ones of the plurality of triangular prism structures 121 adjacent to the array substrate 3 refers to a width of a bottom edge on a side of one of the plurality of first grooves 122 adjacent to the polarizing film 23 in the section perpendicular to the first direction X.

In this way, it can be ensured that the light passing through the first prism film 12 can be converged by the plurality of microlens structures 22, so as to converge more light, so that more of the light is converged upward into the polarizing film 23, thereby increasing the light utilization rate, increasing the brightness of the liquid crystal display panel, and reducing the power consumption.

As shown in FIG. 3, an incident angle of a first light ray 13 and an incident angle of a second light ray 14 on the plurality of triangular prism structures 121 are greater than a critical angle, total reflection occurs on the plurality of triangular prism structures 121, then the first light ray 13 and the second light ray 14 are reflected to the reflective film 11, and after being reflected by the reflective film 11, the first light ray 13 and the second light ray 14 incident into the first prism film 12 again.

As shown in FIG. 3, an incident angle of a third light ray 15 and an incident angle of a fourth light ray 16 on the plurality of triangular prism structures 121 are less than or equal to the critical angle, and refraction occurs on the plurality of triangular prism structures 121, and light rays having refraction angles ranging from 0° to 35° entering the plurality of microlens structures 22 are refracted and converged by the plurality of microlens structures 22, so that more light is converged upward into the polarizing film 23, thereby increasing the light utilization rate, increasing the brightness of the liquid crystal display panel 100, and reducing the power consumption of the liquid crystal display panel 100.

As shown in FIG. 3, an incident angle of a fifth light ray 17 on the plurality of triangular prism structures 121 is less than or equal to the critical angle, and is refracted on the plurality of triangular prism structures 121, and refracted light enters an adjacent one of the plurality of triangular prism structures 121 to be reused.

As shown in FIG. 3, an incident angle of a sixth light ray 18 on the plurality of triangular prism structures 121 is less than or equal to the critical angle, and is refracted on the plurality of triangular prism structures 121, and refracted light does not enter the plurality of microlens structures 22 or an adjacent one of the plurality of triangular prism structures 121 to be reused, but directly enters into the air which cause losses.

As shown in FIG. 1, the polarizing film 23 is disposed between the plurality of microlens structures 22 and the array substrate 3. In fact, a basic structure of the polarizing film 23 includes: a middlemost PVA (polyvinyl alcohol) and two layers of TAC (triacetate cellulose). A PVA layer serves a polarizing role, but PVA can easily hydrolyze. In order to protect physical properties of the polarizing film, a composite layer of high light transmittance and great water resistance which has certain extent of mechanical strength is placed on each side of a TAC film for protection.

The array substrate 3 is disposed on a surface on a side of the first polarizer 2 away from the backlight module 1. The array substrate 3 includes an array base 31 and a thin-film transistor device 32 disposed on a side of the array base 31 away from the backlight module 1.

The color filter substrate 5 is disposed on a side of the array substrate 3 away from the backlight module 1. The color filter substrate 5 includes: a color filter base 51, a black matrix 52, and a color filter film 53.

The color filter base 51 is disposed opposite to the array base 31. The black matrix 52 is disposed on a side of the color filter base 51 facing the array substrate 3, and the black matrix 51 has a plurality of openings.

The color filter film 53 is disposed in the plurality of openings of the black matrix 51, and extends and covers a surface on a side of the black matrix 52 facing the array substrate 3. The color filter film 53 includes a red color resist 531, a green color resist 532, and a blue color resist 533.

The liquid crystal layer 4 is disposed between the array substrate 3 and the color filter substrate 5.

The sealant 6 is disposed between the array substrate 3 and the color filter substrate 5 and surrounds the liquid crystal layer 4.

The second polarizer 7 is disposed on a side of the color filter substrate 5 away from the array substrate 3. In fact, a basic structure of the second polarizer 7 includes: a middlemost PVA (polyvinyl alcohol) and two layers of TAC (triacetate cellulose). A PVA layer serves a polarizing role, but PVA can easily hydrolyze. In order to protect physical properties of the polarizing film, a composite layer of high light transmittance and great water resistance which has certain extent of mechanical strength is placed on each side of a TAC film for protection. A polarization direction of the second polarizer 7 and a polarization direction of the polarizing film 23 are perpendicular to each other.

The cover plate 8 is disposed on a side of the second polarizer 7 away from the array substrate 3. The cover plate 8 is mainly used to protect the liquid crystal display panel 100.

Second Embodiment

Figure 4:
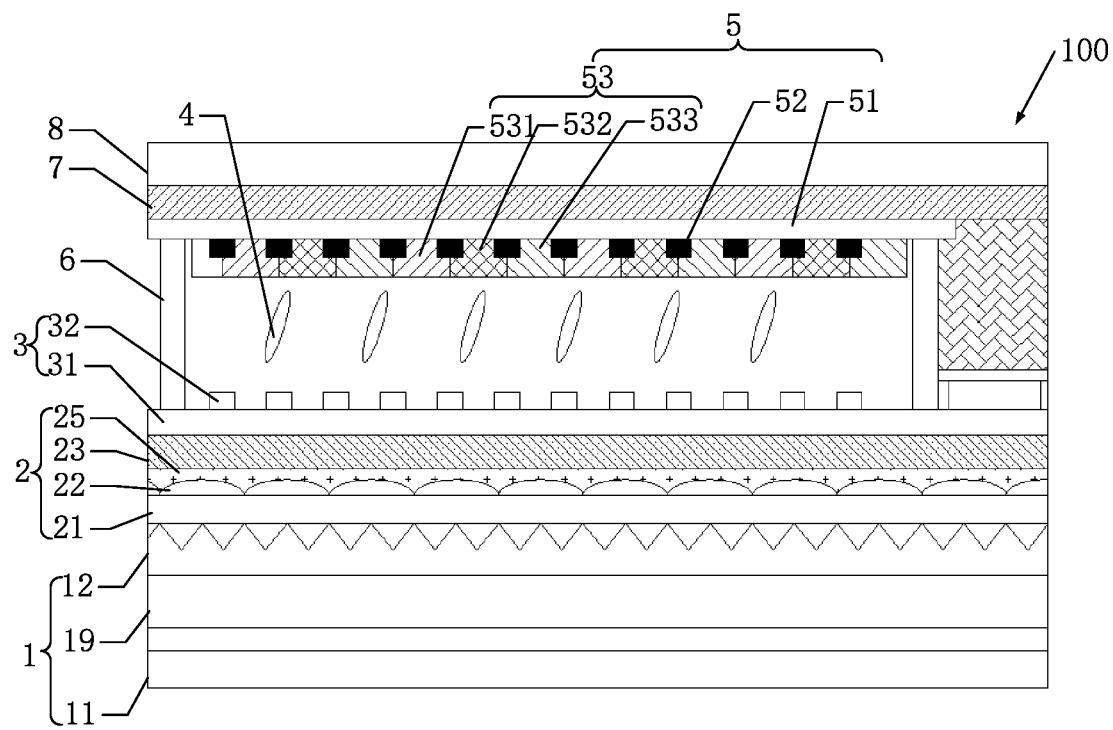
FIG. 4 is a structural schematic view of a liquid crystal display panel provided by a second embodiment of the present application.

As shown in FIG. 4, this embodiment includes most of the technical features of the first embodiment. A difference between this embodiment and the first embodiment is that the first polarizer 2 of this embodiment further includes a planarization layer 25. The planarization layer 25 is disposed in at least one of the plurality of first gaps 24. In this embodiment, the planarization layer 25 covers the plurality of first gaps 24 and extends to cover the plurality of microlens structures 22. Therefore, a planar surface can be provided for disposing of the polarizing film 23, so as to prevent the polarizing film 23 from being damaged due to uneven force and affecting display performance of the liquid crystal display panel 100.

A refractive index of a material of the planarization layer 25 is less than the refractive index of the material of the plurality of microlens structure 22. In this way, an effect of converging the light of the backlight module 1 by the plurality of microlens structures 22 can be achieved.

In this embodiment, the backlight module 1 further includes a second prism film 19. The second prism film 19 is disposed on a side of the first prism film 12 away from the base 21. A surface on a side of the second prism film 19 adjacent to the array substrate 3 has the plurality of triangular prism structures 121 arranged in an array and protruding toward the array substrate 3. The plurality of triangular prism structures 121 of the second prism film 19 extends along the second direction Y perpendicular to the first direction X. The second prism film 19 is configured for reflecting or refracting the light of the backlight again for multiple times, so as to increase the light utilization rate, increasing the brightness of the liquid crystal display panel 100, and reducing the power consumption of the liquid crystal display panel 100.

In this embodiment, the ratio of the first width $L_1$ to the second width $L_2$ is 2. The second width $L_2$ is 50 μm, and the first width $L_1$ of the first surface 221 on the side of each of the plurality of microlens structures 22 adjacent to the backlight module 1 is 100 μm. In this way, it can be ensured that the light passing through the first prism film 12 can be converged by the plurality of microlens structure 22, and more light is converged, so that more light is converged upward into the polarizing film 23, thereby increasing the light utilization rate, increasing the brightness of the liquid crystal display panel, and reducing the power consumption.

Furthermore, the liquid crystal display panel provided by the present application is described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:
1. A liquid crystal display panel comprising:
a backlight module;
a first polarizer disposed on a side of the backlight module; and
an array substrate disposed on a surface on a side of the first polarizer away from the backlight module;
wherein the first polarizer comprises:
a polarizing film disposed between the array substrate and the backlight module; and
a plurality of microlens structures arranged in an array on a side of the polarizing film facing the backlight module;
wherein the backlight module comprises a first prism film, and a surface on a side of the first prism film adjacent to the array substrate has a plurality of triangular prism structures arranged in an array and protruding toward the array substrate;
a first groove is defined between two adjacent ones of the plurality of triangular prism structures, and each of the plurality of microlens structures covers at least one of the plurality of first grooves;
any two adjacent ones of the plurality of microlens structures are abutted against each other, and an abutting side of any two adjacent ones of the plurality of microlens structures is disposed corresponding to a ridge on a side of one of the plurality of triangular prism structures adjacent to the polarizing film.

2. The liquid crystal display panel according to claim 1, wherein both the plurality of microlens structures and the plurality of triangular prism structures of the first prism film extend along a first direction.

3. The liquid crystal display panel according to claim 2, wherein a refractive index of a material of each of the plurality of microlens structures is greater than 1.6.

4. The liquid crystal display panel according to claim 2, wherein a first surface on a side of each of the plurality of microlens structures adjacent to the backlight module is planar, and a second surface on a side of each of the plurality of microlens structures away from the back light module is an arc surface convex toward the array substrate.

5. The liquid crystal display panel according to claim 4, in a section perpendicular to the first direction, an angle between a tangent line of an end point on a side of the second surface of each of the plurality of microlens structures adjacent to the backlight module and the first surface ranges from 30° to 60°.

6. The liquid crystal display panel according to claim 4, wherein a first gap is defined between the plurality of second surfaces of two adjacent ones of the plurality of microlens structures and a surface on a side of the polarizing film adjacent to the backlight module.

7. The liquid crystal display panel according to claim 6, wherein the first polarizer further comprises:
a planarization layer disposed in at least one of the plurality of first gaps.

8. The liquid crystal display panel according to claim 7, wherein a refractive index of a material of the planarization layer is less than the refractive index of the material of the plurality of microlens structures.

9. The liquid crystal display panel according to claim 1, wherein a width of the first surface on the side of each of the plurality of microlens structures adjacent to the backlight module is a first width, and the first width of each of the plurality of microlens structures ranges from 24 micrometers (μm) to 200 μm.

10. The liquid crystal display panel according to claim 9, wherein a height of the plurality of microlens structure ranges from 12 μm to 70 μm.

11. The liquid crystal display panel according to claim 10, wherein a ratio of the first width to the height of the plurality of microlens structure ranges from 2:1 to 3:1.

12. The liquid crystal display panel according to claim 9, wherein a width between two ridges on a side of two adjacent ones of the plurality of triangular prism structures adjacent to the array substrate is a second width; the second width ranges from 24 μm to 110 μm.

13. The liquid crystal display panel according to claim 12, wherein a ratio of the first width to the second width ranges from 1 to 3.

14. The liquid crystal display panel according to claim 2, wherein the backlight module further comprises:
a reflective film disposed on a side of the first prism film away from the array substrate.

15. The liquid crystal display panel according to claim 14, wherein the backlight module further comprises:
a second prism film disposed on the side of the first prism film away from the array substrate;
wherein a surface on a side of the second prism film adjacent to the array substrate has a plurality of triangular prism structures arranged in an array and protruding toward the array substrate.

16. The liquid crystal display panel according to claim 15, wherein the plurality of triangular prism structures of the second prism film extend along a second direction perpendicular to the first direction.

17. The liquid crystal display panel according to claim 1, further comprising:
a color filter substrate disposed on a side of the array substrate away from the backlight module; and
a liquid crystal layer disposed between the array substrate and the color filter substrate.

18. The liquid crystal display panel according to claim 17, wherein the array substrate comprises: an array base and a thin-film transistor device disposed on a side of the array substrate away from the backlight module.

19. The liquid crystal display panel according to claim 17, wherein the color filter substrate comprises:
a color filter base arranged opposite to the array substrate;
a black matrix disposed on a side of the color filter base facing the array substrate, the black matrix having a plurality of openings; and
a color filter film arranged in the plurality of openings of the black matrix and extending and covering a surface on a side of the black matrix facing the array substrate.

20. The liquid crystal display panel according to claim 17, further comprising:
a second polarizer disposed on a side of the color filter substrate away from the array substrate; and
a cover plate disposed on a side of the second polarizer away from the array substrate.

* * * * *